United States Patent
Mak

(10) Patent No.: US 9,671,162 B2
(45) Date of Patent: Jun. 6, 2017

(54) INTEGRATION METHODS OF GAS PROCESSING PLANT AND NITROGEN REJECTION UNIT FOR HIGH NITROGEN FEED GASES

(71) Applicant: FLUOR TECHNOLOGIES CORPORATION, Aliso Viejo, CA (US)

(72) Inventor: John Mak, Santa Ana, CA (US)

(73) Assignee: Fluor Technologies Corporation, Sugar Land, TX (US)

(*) Notice: Subject to any disclaimer, the term of this patent is extended or adjusted under 35 U.S.C. 154(b) by 410 days.

(21) Appl. No.: 14/061,579

(22) Filed: Oct. 23, 2013

(65) Prior Publication Data

US 2014/0114110 A1  Apr. 24, 2014

Related U.S. Application Data

(60) Provisional application No. 61/717,926, filed on Oct. 24, 2012.

(51) Int. Cl.
*F25J 3/02* (2006.01)
*C10L 3/10* (2006.01)

(52) U.S. Cl.
CPC .......... *F25J 3/0257* (2013.01); *C10L 3/105* (2013.01); *F25J 3/0209* (2013.01); *F25J 3/0233* (2013.01); *F25J 3/0238* (2013.01); *C10L 2290/08* (2013.01); *C10L 2290/12* (2013.01); *C10L 2290/46* (2013.01); *C10L 2290/48* (2013.01); *C10L 2290/541* (2013.01); *C10L 2290/545* (2013.01); *F25J 2205/40* (2013.01); *F25J 2205/50* (2013.01); *F25J 2220/66* (2013.01); *F25J 2245/42* (2013.01)

(58) Field of Classification Search
None
See application file for complete search history.

(56) References Cited

U.S. PATENT DOCUMENTS

| 4,761,167 | A | * | 8/1988 | Nicholas | B01D 53/047 62/626 |
|---|---|---|---|---|---|
| 5,792,239 | A | | 8/1998 | Reinhold, III et al. | |
| 2005/0139072 | A1 | | 6/2005 | Landrum et al. | |
| 2009/0035207 | A1 | | 2/2009 | Klein | |
| 2011/0200517 | A1 | | 8/2011 | Find | |
| 2012/0073441 | A1 | | 3/2012 | Mak | |
| 2014/0137599 | A1 | * | 5/2014 | Oelfke | F25J 3/0209 62/619 |

(Continued)

OTHER PUBLICATIONS

PCT/US2013/066440, International Search Report, dated Feb. 18, 2014, 4 pages.

(Continued)

*Primary Examiner* — Tam M Nguyen
(74) *Attorney, Agent, or Firm* — Conley Rose, P.C.; Kristin Jordan Harkins

(57) ABSTRACT

Gas processing plants and methods are contemplated in $CO_2$ is effectively removed to very low levels from a feed gas to an NRU unit by adding a physical solvent unit that uses waste nitrogen produced by the NRU as stripping gas to produce an ultra-lean solvent, which is then used to treat the feed gas to the NRU unit. Most preferably, the physical solvent unit includes a flash unit and stripper column to produce the ultra-lean solvent.

8 Claims, 3 Drawing Sheets

(56) References Cited

U.S. PATENT DOCUMENTS

2014/0275691 A1* 9/2014 Butts .................. C07C 7/11
585/802

OTHER PUBLICATIONS

PCT/US2013/066440, Written Opinion of the International Searching Authority, dated Feb. 18, 2014, 6 pages.
PCT/US2013/066440, International Preliminary Report on Patentability, dated Apr. 28, 2015, 7 pages.

* cited by examiner

INTEGRATION METHODS OF GAS PROCESSING PLANT AND NITROGEN REJECTION UNIT FOR HIGH NITROGEN FEED GASES

This application claims priority to U.S. provisional application with the Ser. No. 61/717,926, filed 24 Oct. 2012, and incorporated by reference herein.

FIELD OF THE INVENTION

The field of the invention is gas processing, and especially processing hydrocarbonaceous feed gas with high nitrogen ($N_2$) content to produce a low $CO_2$ content feed gas ($\leq 1000$ ppm) to a nitrogen rejection unit (NRU), particularly in retrofitting existing gas treating units.

BACKGROUND OF THE INVENTION

Because of the high value of condensate and liquids, oil and gas fields are often injected with nitrogen to increase oil and gas production. As a consequence, the nitrogen content in the feed gas to a downstream gas processing plant from such fields will increase over time. For example, in the initial phase of the gas processing plant operation, nitrogen content in the feed gas from the field is typically low (e.g., 1-3 mol %). As enhanced oil recovery process continues, the nitrogen content in the feed gas to the gas plant can significantly increase (e.g., to as high as 18-30 mol %), which in most cases necessitates the use of a nitrogen rejection unit to remove the nitrogen from processed gas to meet pipeline transmission specification (e.g., typically 3 mol %).

In addition to nitrogen removal, $CO_2$ is also present in most feed gas streams from a gas well and must be removed by an acid gas removal unit (e.g., to 1-2 mol %) to avoid $CO_2$ freezing in a downstream demethanizer column in which natural gas liquids are recovered from the feed gas. $CO_2$ removal is typically performed using an amine unit and produces in most cases a feed stream to a downstream natural gas recovery unit (NGL recovery unit) that will have sufficiently low $CO_2$ content to avoid freezing issues in the NGL recovery unit (e.g., operating at about $-150°$ F. to remove C2+ components). However, a typical NRU operates at a much lower temperatures (e.g., as low as $-250°$ F.), and at such low cryogenic temperatures, the NRU feed gas must contain no more than 0.001 to 0.002 mol % (200 to 2000 ppmv) $CO_2$. Unfortunately, such low levels are commonly not achievable with the amine units of most existing gas processing plants as these units are designed for production of a feed gas to an NGL recovery unit, but not for deep $CO_2$ removal. Thus, in many cases an acid gas removal unit must be revamped for deep $CO_2$ to meet the NRU feed gas specification as exemplarily depicted in Prior Art FIG. 1, described in more detail below.

An amine unit revamp option typically requires increasing solvent circulation and heating duties, and changing out the existing solvent with a more aggressive amine solvent such as DGA (Diglycolamine) or activated MDEA (Methyl Diethanolamine). While such option is at least conceptually possible, capital requirements and operating costs are often very high and require extended plant shutdown, which is generally not desirable. Moreover, most amine plants already operate at maximum capacity and do not have room for further solvent increase. Alternatively, a new amine unit can be added downstream of the NGL recovery unit as exemplarily depicted in Prior Art FIG. 2, and described in more detail below. While additional units are less intrusive than a revamp option, new amine units typically produce a wet treated gas that must be further dried with molecular sieve or other dryers to avoid freezing in the NRU, making this option even more costly.

Nitrogen rejection, $CO_2$ removal, and NGL recovery can be performed in an integrated process having multiple process streams and as fractionation steps as is described, for example, in GB 2500830 or WO 2012/177405. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling. In another approach, $CO_2$ freezing can be entirely avoided by use of a solvent process as described in U.S. Pat. No. 5,406,802 or US 2002/0139244. While such known systems and methods are generally effective for their intended purpose, they will require in most cases de novo installations and will not be suitable for revamps.

Thus, although various configurations and methods are known to reject nitrogen from the feed gas, all or almost all suffer from one or more disadvantages. Among other things, feed gas to the NRU from an upstream $CO_2$ removal unit will often have a $CO_2$ content that is unsuitable for feeding into an NRU, or to achieve low $CO_2$ levels, existing amine units have to be modified or additional amine units must be installed. Viewed from a different perspective, sufficient $CO_2$ removal by an existing amine (or other $CO_2$ removal) unit is not provided or too expensive for economic implementation into a plant with the existing amine (or other $CO_2$ removal) unit. Moreover, where additional amine units are provided, the treated gas is frequently too wet for direct feeding into the NRU and must be dried. Thus, there is still a need to provide improved methods and configurations for $CO_2$ removal in high nitrogen feed gases.

SUMMARY OF THE INVENTION

The inventor has unexpectedly discovered that deep $CO_2$ removal from an NRU feed gas can be achieved by use of an ultra-lean physical solvent that is formed by flashing and stripping with a nitrogen reject stream from the NRU. Thusly treated gas will have a residual $CO_2$ content of 5000 ppmv or lower, more typically 3000 ppmv or lower, even more typically 2000 ppmv or lower, or even 1000 ppmv or lower and so meets the feed gas specification of the NRU.

Most preferably, contemplated physical solvent (e.g., propylene carbonate) regeneration methods use flash regeneration and do not require heating. Moreover, as the physical solvent is in most cases a non-aqueous solvent and operates under a dry environment, production of a dry overhead gas from the solvent absorber is achieved. Notably, such advantage is also realized by use of the dry nitrogen reject (waste) stream from the NRU as the stripping gas for the flashed physical solvent. Therefore, no dehydration of the product gas is required. In contrast, atypical amine using uses an aqueous solvent resulting in a wet gas leaving the amine unit.

In one aspect of the inventive subject matter, a gas treatment plant for treatment of a $CO_2$-and N2-containing feed gas includes a primary $CO_2$ removal unit that receives a feed gas from a feed gas source and that removes from the feed gas $CO_2$ to a first concentration to so form a treated feed gas. A secondary $CO_2$ removal unit is fluidly coupled to the primary $CO_2$ removal unit, receives the treated feed gas, and uses an ultra-lean solvent in an absorber to produce a $CO_2$-loaded solvent and a $CO_2$-depleted feed gas having residual $CO_2$ at a second concentration. Contemplated gas treatment plants will further comprise or be coupled to a nitrogen rejection unit that removes $N_2$ from the $CO_2$-depleted feed gas and produces a $N_2$ waste stream and a pipeline gas, wherein the secondary $CO_2$ removal unit comprises a flash unit and a stripping column fluidly coupled to the absorber. The flash unit is used to flash the $CO_2$-loaded solvent and to produce a flashed solvent, while the stripping column uses the $N_2$ waste stream as a stripping gas for the flashed solvent to thereby produce the ultra-lean solvent. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some aspects of the inventive subject matter the feed gas source is a hydrocarbon production well and that delivers a feed gas with a $N_2$ concentration of at least 10 mol % and a $CO_2$ concentration of at least 2 mol %. In most cases, the feed gas pressure is relatively high (e.g., at least 500 psig, or at least 700 psig, or at least 1000 psig), the primary $CO_2$ removal unit operates with an amine absorber and amine solvent regenerator, and/or the flash unit in the secondary $CO_2$ removal unit is operated such that the flashed solvent has a pressure of equal or less than 100 psig (e.g., which may be accomplished via a hydraulic turbine). Where desired, it is contemplated that the secondary $CO_2$ removal unit further comprises a compressor that increases pressure of the $N_2$ waste stream prior to delivery of the $N_2$ waste stream to the stripping column.

In other aspects of the inventive subject matter, the primary $CO_2$ removal unit is configured such that the treated feed gas has a $CO_2$ concentration of between 1-5 mol %, and the secondary $CO_2$ removal unit is configured such that the $CO_2$-depleted feed gas has a $CO_2$ concentration of equal to or less than 3,000 ppmv $CO_2$, and more preferably equal to or less than 1,000 ppmv $CO_2$.

Therefore, the inventor also contemplates a method of processing a $CO_2$ and $N_2$-containing feed gas (typically a hydrocarbonaceous feed gas) that includes a step of removing in a primary $CO_2$ removal unit $CO_2$ from the feed gas to a first $CO_2$ concentration to thereby form a treated feed gas, and a further step of using an ultra-lean solvent in a secondary $CO_2$ removal unit to further remove $CO_2$ from the treated feed gas to thereby produce a $CO_2$-loaded solvent and a $CO_2$-depleted feed gas having a second $CO_2$ concentration. In another step, $N_2$ is removed from the $CO_2$-depleted feed gas in a nitrogen rejection unit to so produce a $N_2$ waste stream and a pipeline gas, and a portion of the $N_2$ waste stream is then used as a stripping gas in the secondary $CO_2$ removal unit to thereby produce the ultra-lean solvent from the $CO_2$-loaded solvent.

In preferred aspects, the step of removing $CO_2$ in the primary $CO_2$ removal unit involves contacting the feed gas with an amine solvent, and/or the ultra-lean solvent in the secondary $CO_2$ removal unit is a physical solvent (e.g., propylene carbonate). While not limiting to the inventive subject matter, it is also contemplated that $CO_2$ is flashed from the $CO_2$-loaded solvent prior to the step of using the $N_2$ waste stream as a stripping gas. In most cases, it is contemplated that the first $CO_2$ concentration is between 1-5 mol %, and that the second $CO_2$ concentration equal to or less than 3,000 ppmv, and more preferably equal to or less than 1,000 ppmv.

Viewed from a different perspective, the inventors therefore also contemplate a method of regenerating an ultra-lean solvent for deep $CO_2$ removal of a treated feed gas (that typically has equal or less than 2 mol % $CO_2$) that includes a step of using an ultra-lean physical solvent (preferably a non-aqueous physical solvent) in an absorber to remove $CO_2$ from the treated feed gas to thereby form a $CO_2$-loaded solvent and a $CO_2$-depleted feed gas, and a further step of removing in a nitrogen rejection unit $N_2$ from the $CO_2$-depleted feed gas (with typically equal or less than 3,000 ppmv $CO_2$) to thereby produce a $N_2$ waste stream and a pipeline gas. In yet another step, the ultra-lean physical solvent is regenerated from the $CO_2$-loaded solvent in a process that includes flashing the $CO_2$-loaded solvent (e.g., reduction of pressure of the $CO_2$-loaded solvent by at least 1,000 psig) and stripping the flashed $CO_2$-loaded solvent using the $N_2$ waste stream as a stripping gas. Most preferably (but not necessarily), the regeneration of the ultra-lean solvent is performed without heating the $CO_2$-loaded solvent or flashed $CO_2$-loaded solvent.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

Prior Art

Prior Art

DETAILED DESCRIPTION

The inventor has discovered that $CO_2$ can be effectively removed to very low levels from a feed gas to an NRU unit by adding a physical solvent unit that uses waste nitrogen produced by the NRU as stripping gas to produce an ultra-lean solvent, which is then used to treat the feed gas to the NRU unit. So treated gas will typically have equal or less than 0.001 mol % $CO_2$ and can be fed to the NRU to produce a pipeline quality gas. Most typically, the feed gas has a relatively low $CO_2$ concentration (e.g., 1-2 mol %) and has been subjected to a prior CO2 removal step as discussed in more detail below. While contemplated systems and methods can be employed in a grass roots installation, it should be appreciated that the inventive subject matter is particularly advantageous where an existing $CO_2$ removal facility does not provide sufficient $CO_2$ removal capability for a new or existing downstream NRU. Integration of the physical solvent unit will provide numerous advantages, including deep $CO_2$ removal at capital requirement and low cost operation, simplified process flow, and elimination of an otherwise typically required drying step.

Figure 1:
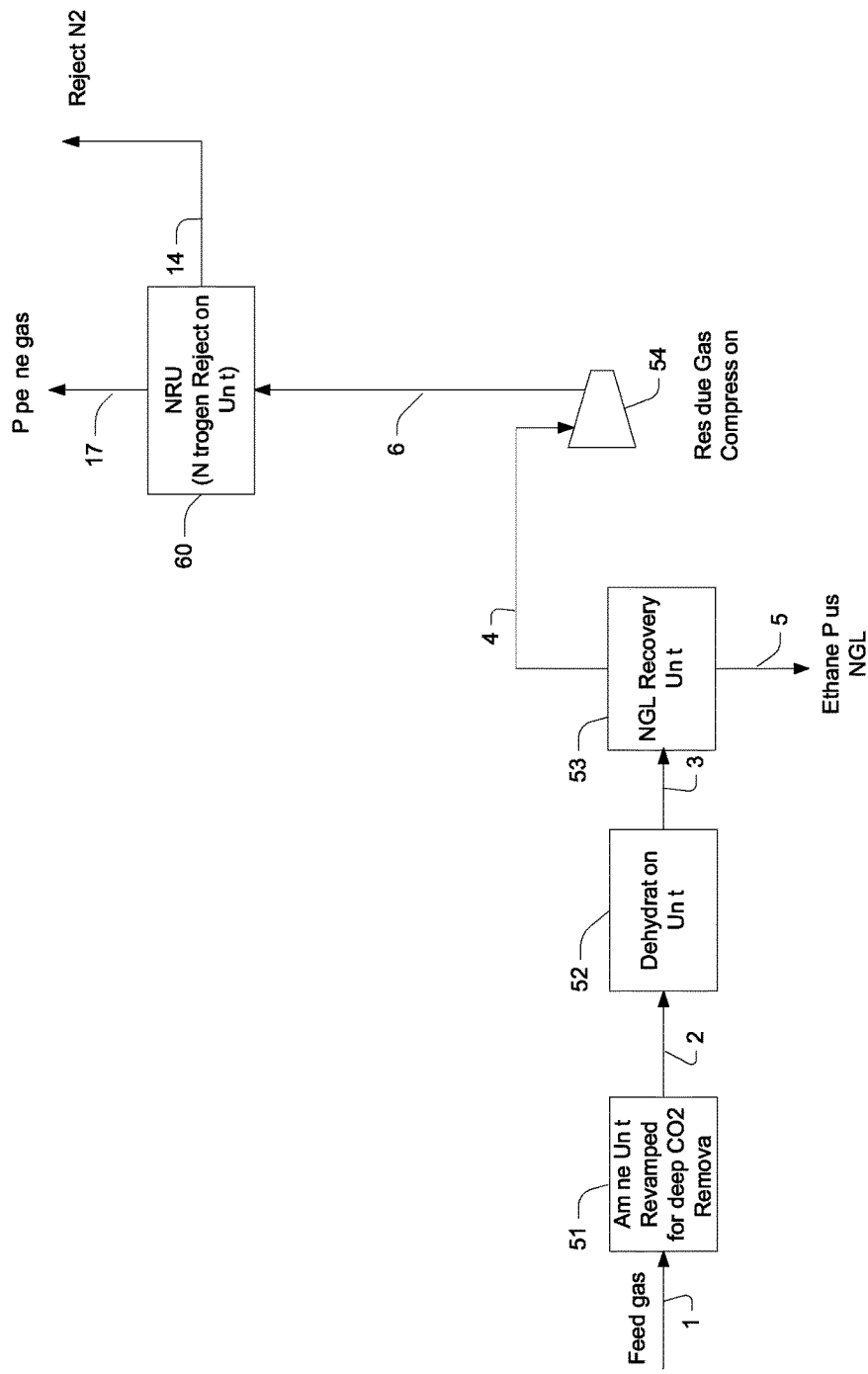
FIG. 1 is an exemplary configuration of a modified gas processing plant with a revamped amine unit for processing high nitrogen feed gas.

In contrast, a typical known gas processing configuration for nitrogen rejection is shown in Prior Art FIG. 1. Feed gas 1, typically at 1000 psig to 1500 psig, contains 15-20 mol % $N_2$ and is treated in amine unit 51, producing a treated gas stream 2 with 1-2 mol % $CO_2$, which is acceptable to avoid $CO_2$ freezing in the NGL unit. However, if nitrogen rejection is required, the $CO_2$ content must be further reduced to meet the $CO_2$ specification by the downstream NRU 60, typically to 2000 ppmv or lower. The recitation of ranges of values herein is merely intended to serve as a shorthand method of referring individually to each separate value falling within the range. Unless otherwise indicated herein, each individual value with a range is incorporated into the specification as if it were individually recited herein. The treated gas 2 is dried in molecular sieve drier 52 forming dried stream 3, which is then processed in NGL recovery unit 53. The NGL recovery 53 unit can be designed for either propane recovery or ethane recovery. The NGL unit 53 produces an NGL stream 5 and a lean gas stream 4 that is compressed by a residue gas compressor 54 to a pressure of about 1000 psig to 1500 psig forming stream 6, which is then fed to the NRU 60 that produces a r $N_2$ waste stream 14 that is vented to the atmosphere, and a $N_2$ depleted stream 17 that is sent to the sales gas pipeline (most pipeline specifications require the gas to contain no more than 3 mol % nitrogen). As used herein, the term "about" in conjunction with a numeral refers to a range of that numeral starting from 20% below the absolute of the numeral to 20% above the absolute of the numeral, inclusive. For example, the term "about 100° F." refers to a range of 80° F. to 120° F., inclusive, and the term "about 100 psig" refers to a range of 80 psig to 120 psig, inclusive.

The cold box and fractionation columns (not shown) in the NRU typically operate at very low temperatures, in most cases at −250° F. or lower, which means the residual $CO_2$ content in the gas stream from a conventional amine unit that is ultimately delivered to the NRU exceeds levels at which $CO_2$ freezing in the NRU becomes problematic (and renders the NRU inoperable). For this reason, amine unit 51 must be revamped for deeper $CO_2$ removal. However, this may not be feasible if the amine unit is already operating at it maximum capacity, or will be expensive and thus an economically unattractive solution.

Figure 2:
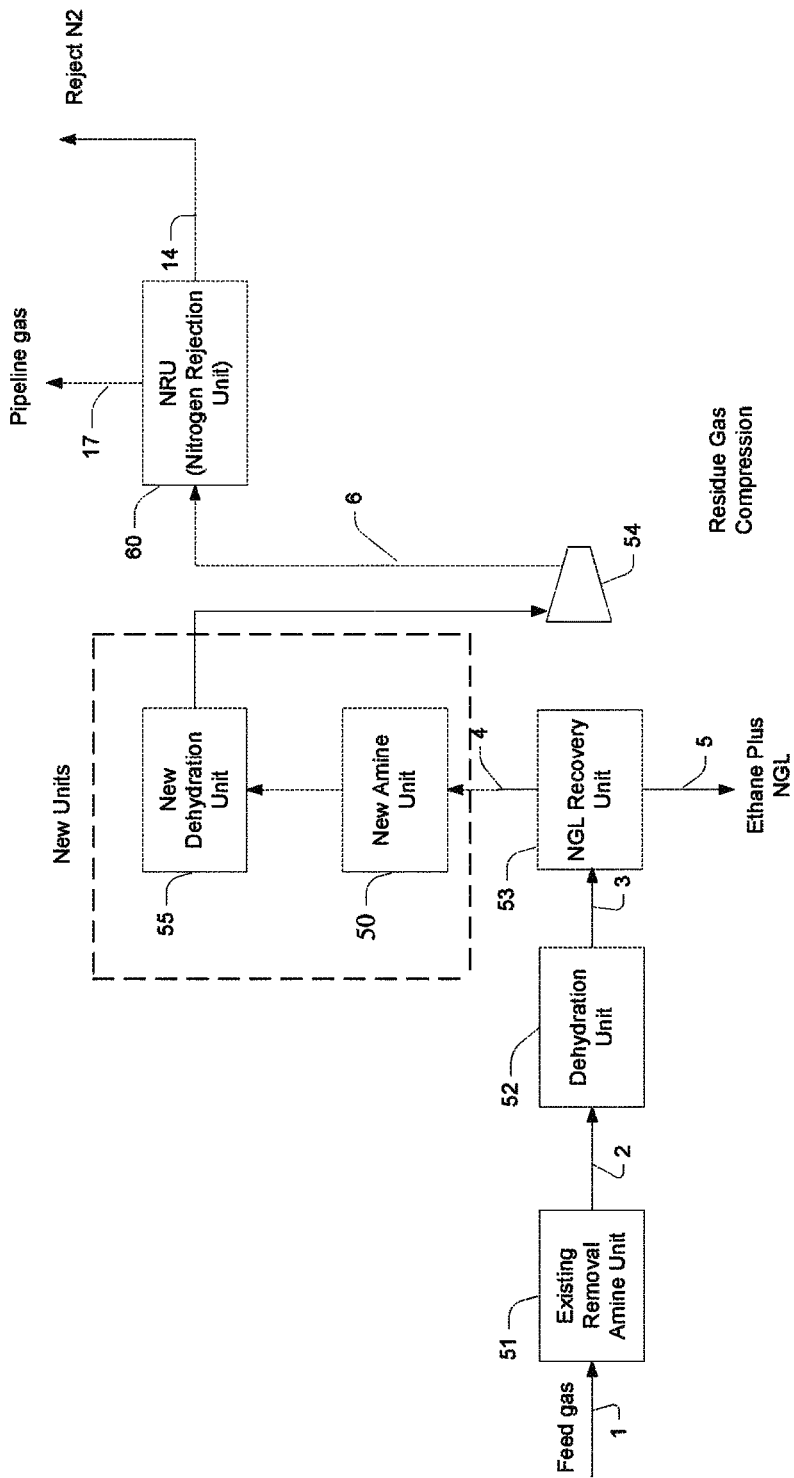
FIG. 2 is another exemplary configuration of a modified gas processing plant with an additional amine unit for processing high nitrogen feed gas.

Alternatively, as shown in Prior Art FIG. 2 where like numerals depict like components as shown in Prior Art FIG. 1, a new amine unit 50 is used to treat the lean gas stream 4 from the NGL recovery unit 53 to reduce its $CO_2$ content from, typically 1-2 mol % to 2000 ppm or lower, using a more aggressive amine such as DGA or activated MDEA. The treated gas from the new amine unit 50 is saturated with water and generally requires drying in a dehydration unit 55 (e.g., molecular sieve dehydration unit) producing a dry gas with $CO_2$ content that is acceptable to the downstream NRU unit 60. Gas stream 6 is typically re-compressed by residue gas compressor 54 prior to entry into the NRU. Unfortunately, the addition of a new amine and dehydration renders such option often very costly. With respect to the remaining numerals, the same considerations for like components with like numerals as provided for Prior Art FIG. 1 apply.

In contrast, the configurations and methods according to the inventive subject matter will overcome the difficulties of known configurations in a conceptually simple and elegant manner that allows for implementation in a grass roots facility as well as in a retrofit. More particularly, a physical solvent unit is fluidly coupled between the amine unit and the NRU that reduces the residual CO2 concentration in the gas stream to a level acceptable for use in a NRU. In further preferred aspects, the physical solvent unit receives the gas stream that was previously subjected to CO2 removal after compression to a suitable pressure (e.g., pressure of the NRU or pipeline pressure).

Figure 3:
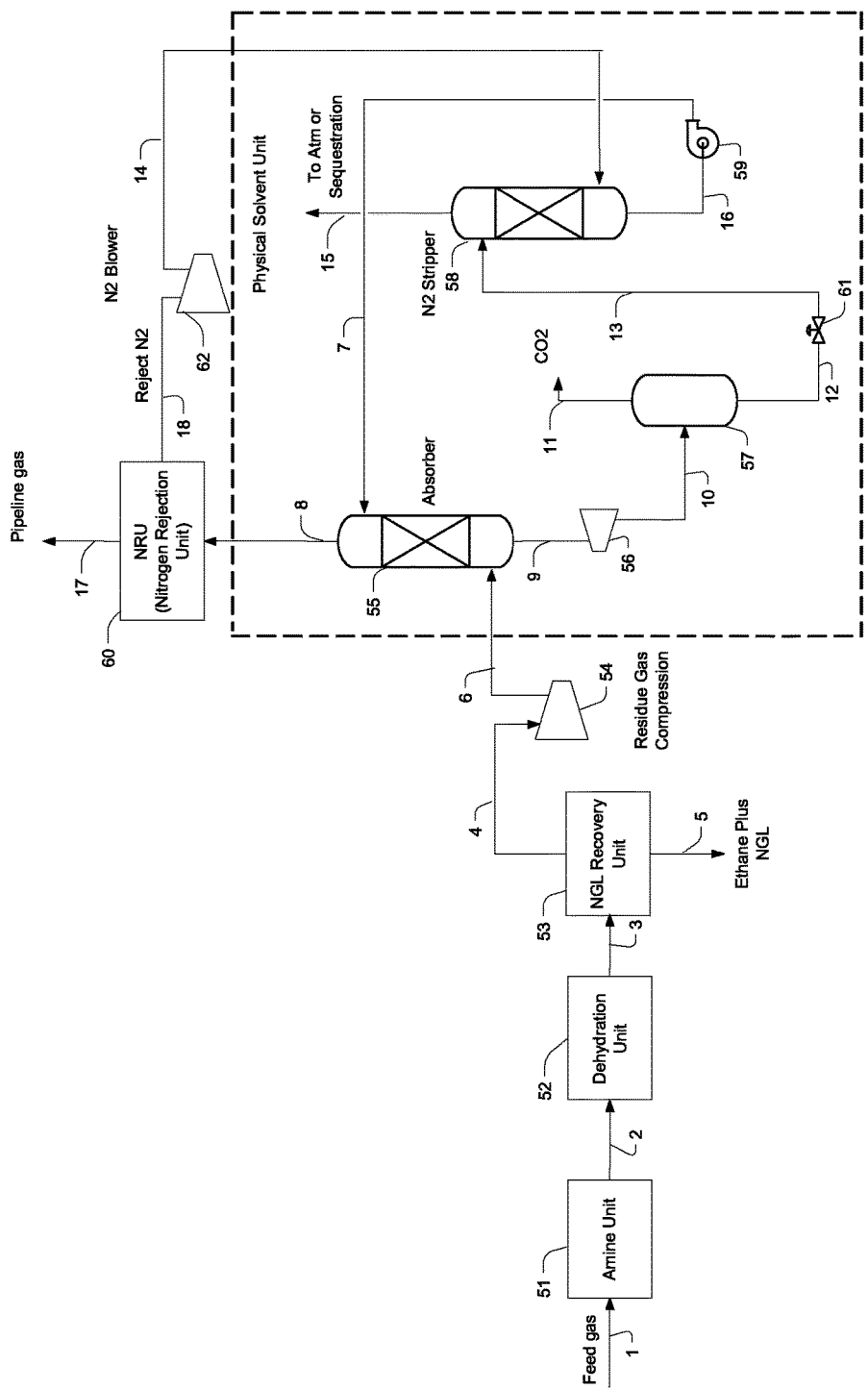
FIG. 3 is an exemplary configuration of a gas processing plant according to the inventive subject matter.

For example, FIG. 3 exemplarily depicts a gas treatment plant for treatment of a feed gas that comprises $CO_2$ and $N_2$. Here, the hydrocarbonaceous feed gas 1 (e.g., from a oil and/or gas production well), typically at 1000 psig to 1500 psig, contains 15-20 mol % $N_2$ and is treated in amine unit 51, producing a treated gas stream 2 with 1-2 mol % $CO_2$, which is acceptable to avoid $CO_2$ freezing in the NGL unit 53. However, with the feed gas composition of the example, nitrogen rejection is required to meet the $CO_2$ specification by the downstream NRU 60 (e.g., in most cases 2000 ppmv or lower). The so treated feed gas 2 is dried in molecular sieve drier 52 (or other drying unit, e.g., glycol dryer) forming dried stream 3, which is then processed in NGL recovery unit 53. The NGL recovery 53 unit can be designed for propane recovery and/or ethane recovery as desired and produces an NGL stream 5 and a lean gas stream 4. The lean stream 4 is then compressed by residue gas compressor 54 to a pressure of about 1000 psig to 1500 psig forming stream 6, which is then fed to the physical solvent unit that receives a $N_2$ waste stream from the NRU and that ultimately produces a $CO_2$-depleted feed gas, a $CO_2$-rich flash stream and $N_2$-rich stripper overhead stream as further described in more detail below.

In the physical solvent unit, gas stream 6 having relatively high nitrogen content is fed to absorber 55 that is configured to receive an ultra-lean solvent 7. In especially preferred aspects, the ultra-lean solvent is a physical solvent (preferably propylene carbonate) having a very low residual $CO_2$ content (typically no more than 0.1 mol %, and even more typically no more than 0.01 mol %). It should be appreciated that among other advantages, a particularly desirable technical effect of using an ultra-lean physical solvent on a previously decarbonized solvent (i.e., solvent from which $CO_2$ was previously removed in a separate and distinct device) is that the residual CO2 concentration can be reduced more effectively at increased pressure due to Henry's law. Moreover, use of an ultra-lean solvent allows even further deep $CO_2$ removal, which would not be achievable with a chemical solvent under elevated pressure. Still further, use of an ultra-lean physical solvent advantageously allows regeneration that does not require heating (particularly in combination with a $N_2$ stripping step) and so eliminates or reduces greenhouse gas emissions associated with solvent recovery.

Absorber 55 produces a $CO_2$-depleted feed gas as overhead stream 8 containing in some embodiments equal or less than 3,000 ppmv $CO_2$, in other embodiments equal or less than 2,000 ppmv $CO_2$, and in yet other embodiments equal or less than 1,000 ppmv $CO_2$, as well as a $CO_2$-loaded solvent 9 at relatively high pressure that is predominantly determined by the residue gas compressor 54. The $CO_2$-loaded solvent 9 is then letdown in pressure in a hydraulic turbine 56 (or other suitable pressure reduction device) to about 50 psig, and is flashed via stream 10 to the separator 57, which produces a $CO_2$ rich flash stream 11 that can be used as a low pressure fuel gas. Flashed solvent stream 12 is further letdown in pressure in JT valve 61 forming stream 13, which is fed to solvent stripper 58. The $N_2$ waste stream 14 from the NRU 60 is used in stripping the flashed solvent stream to produce an ultra-lean solvent 16, which is pumped by pump 59 to about 1000 to 1500 psig forming stream 7 that is re-circulated to the absorber 55.

The $CO_2$-depleted feed gas 8 from the physical solvent unit is further processed in the NRU 60, producing a pipeline gas 17 that now meets the pipeline specification (e.g., having equal or less than 3 mol %, and more preferably equal or less than 2 mol % nitrogen). At least a portion of the rejected nitrogen leaves the NRU 60 as $N_2$ waste stream 18 that is compressed by nitrogen blower 62 (e.g., to about 5-50 psig) to form stream 14 which is fed to the physical solvent unit as stripping gas in stripper 58. It should be appreciated that the $N_2$ waste stream can be produced in the NRU at 5 to 10 psig such that nitrogen blower 62 may not be required. $N_2$ stripper 58 uses the $N_2$ waste stream as stripping gas and produces a $N_2$ rich striper overhead stream 15 stream that can now be vented to the atmosphere or routed to sequestration.

While all physical solvents (and various non-physical solvents following Henry's law) are generally contemplated suitable for use herein, especially preferred physical solvents include FLUOR SOLVENT™ (propylene carbonate), NMP (normal-methyl prrolidone), SELEXOL™ (dimethyl ether of polyethylene glycol), and TBP (tributyl phosphate). As already noted above, physical solvents provide numerous advantages over chemical solvents and other $CO_2$ removing processes (e.g., membrane separation, PSA, etc.) and especially allow increased solubilization of $CO_2$ at increased pressure, the capability to remove dissolved $CO_2$ by flashing without the need for steam regeneration. Moreover, where the physical solvent is anon-aqueous solvent, the $CO_2$-depleted feed gas will not require a downstream dehydration unit.

Consequently, it is generally preferred that the absorber in the physical solvent unit will operate at elevated pressure, and contemplated elevated pressures include 500-700 psig, 700-1,000 psig, 1,000-1,500 psig, and even higher. Viewed from another perspective, it is generally preferred that the absorber operates at a pressure that is suitable for feeding the $CO_2$-depleted feed gas directly into the NRU and/or pipeline without further need of re-compression. Thus, suitable pressures will be at least 700 psig, at least 1,000 psig, at least 1,200 psig, at least 1,500 psig, or, even higher, but generally less than 3,000 psig. In some aspects, the absorber may even operate at supercritical pressures. Absorbers for physical solvents to capture $CO_2$ are well known in the art, and all such absorbers are deemed suitable for use herein.

The so produced $CO_2$-loaded solvent is preferably reduced in pressure to a pressure that allows flashing of the $CO_2$ to an remove at least 50%, more preferably at least 70%, even more preferably at least 80%, and most preferably substantially all (i.e., greater of equal than 90%) of the previously dissolved $CO_2$. Consequently, and depending on the absorber pressure and pressure reduction, the $CO_2$-loaded solvent is reduced in pressure in an amount of at least 500 psig, more typically at least 700 psig, and most typically at least 1,000 psig. Viewed from a different perspective, the residual pressure in the flashed solvent will typically be between 0-50 psig, or between 50 and 100 psig, or between 20 and 20 psig.

There are numerous pressure reduction devices known in the art, and all of them are deemed suitable for use herein. However it is especially preferred (but not necessary) that the pressure reduction device is suitable to recover at least some energy. For example, suitable pressure reduction devices could be hydraulic turbines to reduce energy consumption (e.g., via generation of electrical energy, or mechanical energy for pumping flashed solvent, etc.). Therefore, it should be noted that one of the advantages of flashing the physical solvent is that significant quantities of $CO_2$ can be removed without expenditure of heat energy while at the same time recovering or generating energy from the expansion step. Moreover, so flashed solvent is easily separated in a separator (flash vessel) and further processed while the $CO_2$-rich flash stream can be routed to an incinerator or sequestration unit. Most typically, the $CO_2$-rich flash stream will comprise at least 50 mol % $CO_2$, in further embodiments at least 70 mol % $CO_2$, and in still further embodiments at least 90 mol % $CO_2$, with the remaining components mainly being $N_2$, $CH_4$, and inert compounds.

In further contemplated aspects of the inventive subject matter, the flashed solvent is then reduced in pressure, most typically to a residual pressure of between atmospheric pressure (zero psig) and 50 psig to allow for stripping with a low-pressure $N_2$ waste stream from the NRU. In most instances, pressure reduction is performed across a JT-valve, but other pressure reduction devices are also deemed suitable for use herein. However, it should be noted that the flashed solvent may also be subjected to stripping without further pressure reduction (especially where the flashing step already produces a low-pressure flashed solvent). $N_2$ stripping is in most cases performed in a conventional stripping column that receives the flashed and pressure-reduced solvent, and the nitrogen used for stripping is at least in part derived from the NRU. Depending on the particular $N_2$ content of the hydrocarbonaceous feed gas, it is contemplated that at least 10%, at least 30%, at least 50%, at least 70%, or at least 90% of the $N_2$ waste stream from the NRU is used to strip the flashed and pressure reduced solvent. The overhead product of the stripping column is typically vented to the atmosphere as $N_2$-rich stripper overhead stream, but may also be further processed (e.g., via PSA, membrane process, etc.) or routed to sequestration.

Among other technical advantages it should be recognized that stripping of the flashed solvent with the $N_2$ waste stream from the NRU not only produces an ultra-lean physical solvent having residual CO2 content of (typically no more than 0.1 mol %, and even more typically no more than 0.01 mol %), but also makes effective use of the $N_2$ waste stream that would otherwise be vented to the atmosphere.

Such stripping is in significant contrast to U.S. Pat. No. 6,174,348 that teaches use of a chemical solvent, which must be regenerated with a steam reboiler as the solvent is a chemical solvent and as the flashing does not effectively removes the $CO_2$ from the solvent. Moreover, the nitrogen is not provided from within the process (feed gas via the NRU) but obtained from an external air separation unit that must be collocated with the stripper, thereby further adding to the energy inefficiency of this system. Lastly, the '348 system also fails to recover energy from the flashing that could be at least in part used to drive the ultra-lean solvent as described in FIG. 3.

It should also be appreciated that contemplated plants and methods can be implemented in a grass roots installation or as a retrofit to an already existing acid gas/nitrogen removal unit. With respect to the primary $CO_2$ removal unit in contemplated plants and methods it is generally contemplated that any type of acid gas removal unit is suitable for use herein (e.g., solvent based, membrane-based, sorbent based, etc.), however, chemical solvent-based units are particularly preferred. Therefore, in most aspects of the inventive subject matter, an amine absorber and amine solvent regenerator will be used to reduce $CO_2$ concentration in the feed gas from >10 mol % to 1-5 mol % $CO_2$, and more typically 1-2 mol % $CO_2$. Secondary $CO_2$ removal units will preferably use a physical solvent unit that reduces $CO_2$ concentration from 1-2 mol % $CO_2$ to equal or less than 3,000 ppm, equal or less than 2,000 ppm, equal or less than 1,000 ppm, and even lower. As noted before, it should therefore be appreciated that where the physical solvent unit reduces $CO_2$ by flash and $N_2$-stripping, an ultra-lean solvent can be produced in a simple and energy efficient manner, particularly where the nitrogen stream is obtained from the same NRU that is used to reduce the nitrogen concentration of the feed gas.

Consequently, the inventor also contemplates a method of processing a feed gas that includes $CO_2$ and $N_2$ in which $CO_2$ is removed from the feed gas in a primary $CO_2$ removal unit to a first $CO_2$ concentration (e.g., 1-5 mol %, or 1-3 mol %, or 1-2 mol %, or 0.5-2 mol %) to so form a treated feed gas, and in which an ultra-lean solvent is used in a secondary $CO_2$ removal unit to further remove $CO_2$ from the treated feed gas to so form a $CO_2$-loaded solvent and a $CO_2$-depleted feed gas having a second $CO_2$ concentration (equal to or less than 3,000 ppmv $CO_2$, equal to or less than 2,000 ppmv $CO_2$, equal to or less than 1,000 ppmv $CO_2$, or between 2,000 and 200 ppmv $CO_2$, or between 2,000 and 500 ppmv $CO_2$). Nitrogen is then removed from the $CO_2$-depleted feed gas in a NRU to thereby produce a $N_2$ waste stream and a pipeline gas, and at least a portion of the $N_2$ waste stream is used as a stripping gas in the secondary $CO_2$ removal unit to thereby produce the ultra-lean solvent from the $CO_2$-loaded solvent.

Therefore, in view of the above and attached figures, it should also be appreciated that the inventors contemplate a method of regenerating an ultra-lean solvent for deep $CO_2$ removal of a treated feed gas that has equal or less than 2 mol % $CO_2$ in which an ultra-lean physical solvent is used in an absorber to remove $CO_2$ from the treated feed gas to thereby form a $CO_2$-loaded solvent and a $CO_2$-depleted feed gas. Nitrogen is then removed from the $CO_2$-depleted feed gas in a NRU to thereby produce a $N_2$ waste stream and a pipeline gas, and the ultra-lean physical solvent is then regenerated from the $CO_2$-loaded solvent via flashing the $CO_2$-loaded solvent and stripping the flashed $CO_2$-loaded solvent using the $N_2$ waste stream as a stripping gas.

Thus, specific embodiments and applications for the configuration of acid gas removal unit and nitrogen rejection unit have been disclosed. It should be apparent, however, to those skilled in the art that many more modifications besides those already described are possible without departing from the inventive concepts herein. The inventive subject matter, therefore, is not to be restricted except in the spirit of the present disclosure. Moreover, in interpreting the specification and contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of processing a feed gas that includes $CO_2$ and $N_2$, comprising:
   removing in a primary $CO_2$ removal unit $CO_2$ from the feed gas to a first $CO_2$ concentration to thereby form a treated feed gas;
   using an ultra-lean solvent to further remove $CO_2$ from the treated feed gas to thereby produce a $CO_2$-loaded solvent and a $CO_2$-depleted feed gas having a second $CO_2$ concentration;
   removing in a nitrogen rejection unit $N_2$ from the $CO_2$-depleted feed gas to thereby produce a $N_2$ waste stream and a pipeline gas; and
   using a portion of the $N_2$ waste stream as a stripping gas to thereby produce the ultra-lean solvent from the $CO_2$-loaded solvent.

2. The method of claim 1 wherein the step of removing in a primary $CO_2$ removal unit comprises contacting the feed gas with an amine solvent.

3. The method of claim 1 wherein the ultra-lean solvent is a physical solvent.

4. The method of claim 1 further comprising a step of flashing the $CO_2$-loaded solvent prior to the step of using the $N_2$ waste stream as a stripping gas.

5. The method of claim 1 wherein the feed gas is a hydrocarbonaceous feed gas.

6. The method of claim 1 wherein the first $CO_2$ concentration is between 1-5 mol %, and wherein the second $CO_2$ concentration equal to or less than 3,000 ppmv.

7. The method of claim 1 wherein the first $CO_2$ concentration is between 1-5 mol %, and wherein the second $CO_2$ concentration equal to or less than 1,000 ppmv.

8. The method of claim 1, wherein the step of using an ultra-lean solvent to further remove $CO_2$ from the treated feed gas is performed in an absorber of a secondary $CO_2$ removal unit, and wherein the step of using a portion of the $N_2$ waste stream as a stripping gas is performed in a stripping column of the secondary $CO_2$ removal unit.

* * * * *

UNITED STATES PATENT AND TRADEMARK OFFICE
CERTIFICATE OF CORRECTION

PATENT NO. : 9,671,162 B2
APPLICATION NO. : 14/061579
DATED : June 6, 2017
INVENTOR(S) : John Mak Page 1 of 1

It is certified that error appears in the above-identified patent and that said Letters Patent is hereby corrected as shown below:

In the Specification

Column 5, Line 14: delete "r"

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*